(12) United States Patent
Green

(10) Patent No.: US 12,517,379 B2
(45) Date of Patent: Jan. 6, 2026

(54) RETINAL STIMULATION DEVICE FOR MITIGATION OF MYOPIA PROGRESSION

(71) Applicant: SHAMIR OPTICAL INDUSTRY LTD., Kibbutz Shamir (IL)

(72) Inventor: Uri Green, Kibbutz Alonei Habashan (IL)

(73) Assignee: SHAMIR OPTICAL INDUSTRY LTD., Kibbutz Shamir (IL)

( * ) Notice: Subject to any disclaimer, the term of this patent is extended or adjusted under 35 U.S.C. 154(b) by 897 days.

(21) Appl. No.: 17/779,758

(22) PCT Filed: Nov. 11, 2020

(86) PCT No.: PCT/IL2020/051172
§ 371 (c)(1),
(2) Date: May 25, 2022

(87) PCT Pub. No.: WO2021/105979
PCT Pub. Date: Jun. 3, 2021

(65) Prior Publication Data
US 2022/0404642 A1    Dec. 22, 2022

Related U.S. Application Data

(60) Provisional application No. 62/941,743, filed on Nov. 28, 2019.

(51) Int. Cl.
*G02C 7/10*    (2006.01)
(52) U.S. Cl.
CPC ......... *G02C 7/105* (2013.01); *G02C 2202/24* (2013.01)

(58) Field of Classification Search
CPC ..... G02C 7/105; G02C 2202/24; G02C 7/107
See application file for complete search history.

(56) References Cited

U.S. PATENT DOCUMENTS

| 9,074,750 B2 | 7/2015 | Foulds et al. |
| 2007/0103641 A1 | 5/2007 | Bonnin |
| 2007/0103651 A1* | 5/2007 | Wu .......................... H04N 5/74 |
| | | 348/E5.142 |

FOREIGN PATENT DOCUMENTS

| CN | 105372836 A | 3/2016 |
| CN | 105874376 A | 8/2016 |
| CN | 108732784 A | 11/2018 |
| CN | 109477977 A | 3/2019 |

(Continued)

OTHER PUBLICATIONS

Davis, et al., Humans perceive flicker artifacts at 500 Hz, Scientific Reports, 5(7861):1-4 (2015).

(Continued)

*Primary Examiner* — James C. Jones
(74) *Attorney, Agent, or Firm* — FisherBroyles, LLP; Roger L. Browdy; James E. Mrose

(57) ABSTRACT

The present invention relates to a novel lens unit being configured for spectral selective retinal stimulation modulation, which is advantageously a passive modulation effect in the lens of the invention. More specifically, the lens unit comprises a lens substrate having a certain volume defining a front and back surface, wherein the lens unit carries a spectral coder which, when the lens unit is in use, operates as a temporal spectral coder with respect to a portion of input light interacting with the lens unit and reaching the eye.

20 Claims, 11 Drawing Sheets

(56) References Cited

FOREIGN PATENT DOCUMENTS

DE   202018002297 U1   6/2018
WO   2018/076057 A1   5/2018

OTHER PUBLICATIONS

Inger, et al., Potential Biological and Ecological Effects of Flickering Artificial Light, PLOS One, 9(5):1-11 (2014).
Rucker, et al., Blue Light Protects Against Temporal Frequency Sensitive Refractive Changes, IOVS, 56(10):6121-6131 (2015).
Rucker, et al., Color and Temporal Frequency Sensitive Eye Growth in Chick, IOVS, 59(15):6003-6013 (2018).

* cited by examiner

Fig. 3A

| | Material | Thickness [nm] |
|---|---|---|
| BASE | sio2 | 76.84 |
| | tio2 | 74.23 |
| | sio2 | 4.59 |
| | tio2 | 34.22 |
| | sio2 | 26.19 |
| | tio2 | 12.97 |
| | sio2 | 204.43 |
| CAP | sio2 | 99.05 |
| | tio2 | 123.54 |
| | sio2 | 31.51 |
| | tio2 | 15.74 |
| | Sio2 | 133.67 |

| | Material | Thickness [nm] |
|---|---|---|
| BASE | sio2 | 76.84 |
| | tio2 | 74.23 |
| | sio2 | 4.59 |
| | tio2 | 34.22 |
| | sio2 | 26.19 |
| | tio2 | 12.97 |
| | sio2 | 204.43 |
| CAP | sio2 | 105.32 |
| | tio2 | 154.26 |
| | sio2 | 16.7 |
| | tio2 | 16.72 |
| | Sio2 | 96.63 |

| | Material | Thickness [nm] |
|---|---|---|
| BASE | sio2 | 76.84 |
| | tio2 | 74.23 |
| | sio2 | 4.59 |
| | tio2 | 34.22 |
| | sio2 | 26.19 |
| | tio2 | 12.97 |
| | sio2 | 204.43 |
| CAP | sio2 | 119.64 |
| | tio2 | 121.73 |
| | sio2 | 20.69 |
| | tio2 | 21.69 |
| | Sio2 | 134.65 |

32% 450nm

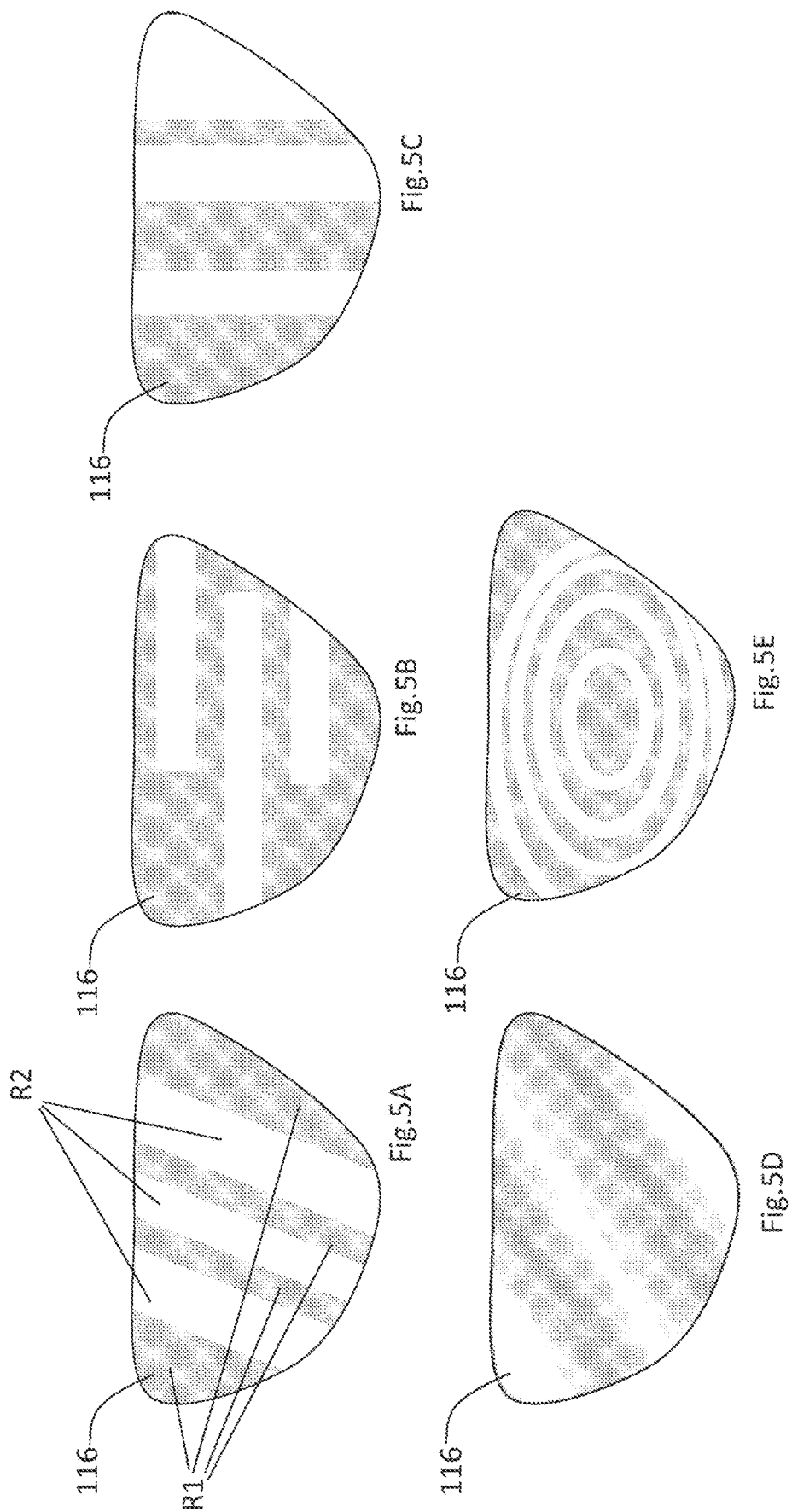

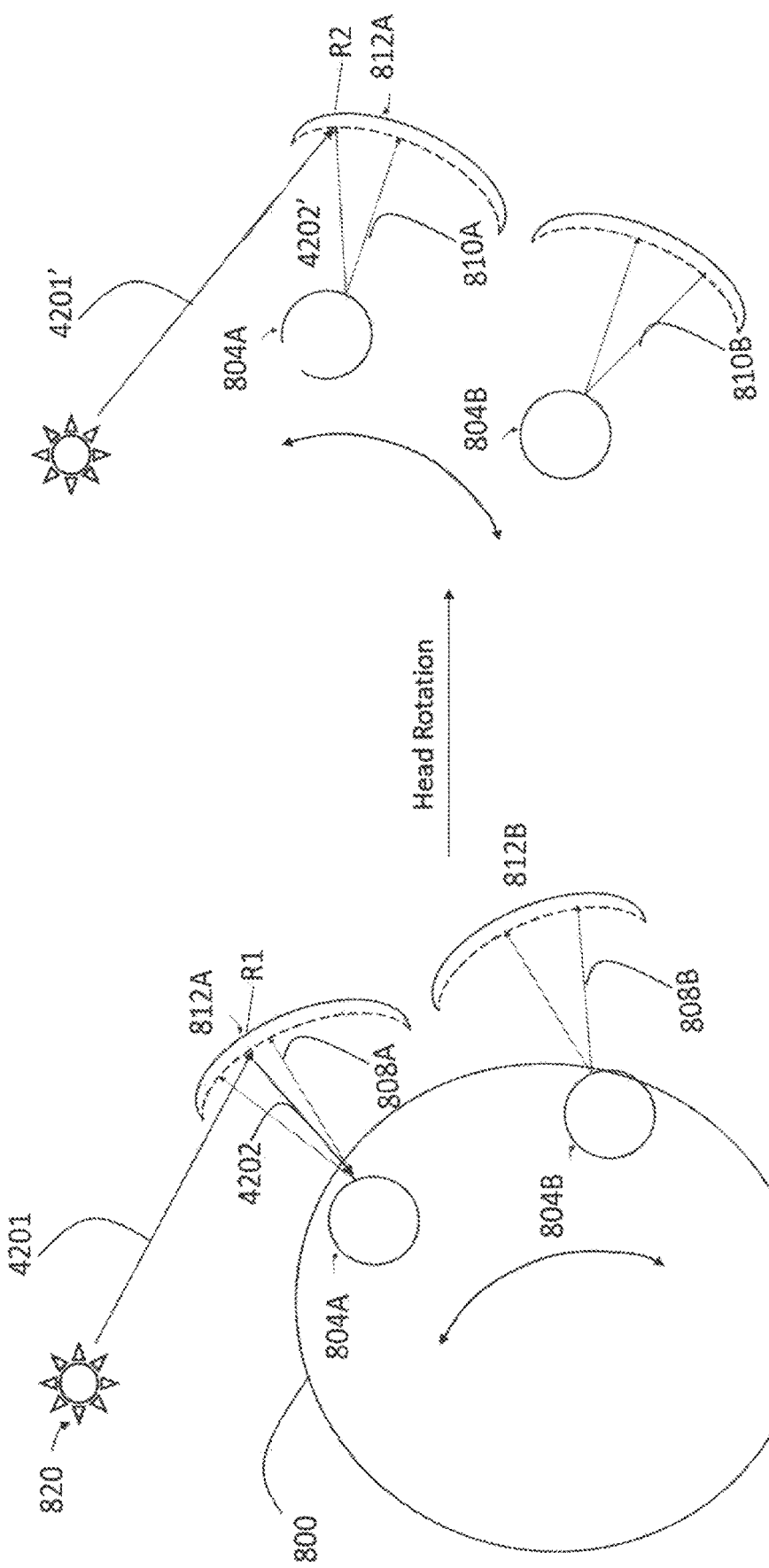

RETINAL STIMULATION DEVICE FOR MITIGATION OF MYOPIA PROGRESSION

TECHNOLOGICAL FIELD

The present invention relates to an optical device for treating an eye disorder, in particular for the mitigation of progression of myopia.

BACKGROUND

Myopia, also known as near-sightedness, is a condition of the eye where light from distant objects focuses in front of, instead of on, the retina. This causes distant objects to be seen as blurry by the observer, while near objects appear normal. Other symptoms may include headaches and eye strain, whereas severe near-sightedness increases the risk of retinal detachment, cataracts, and glaucoma. Near-sightedness is the most common eye problem and is estimated to affect 1.5 billion people worldwide (22% of the population).

The exact underlying mechanism for myopia is still not fully understood, however in most cases it is caused by elongation of the eyeball or, less commonly, by the excess of optical power in the eye. There is tentative evidence that the risk of myopia can be decreased by having young children spend more time outdoors.

Time spent outdoors during childhood is positively associated with reduced myopia prevalence. This positive association is not affected by near work nor levels of physical activity engaged in while outdoors. With this in mind, a previous study, using the chick model, examined how short wavelength light interacts with the temporal sensitivity of the visual system during emmetropization. The results showed that when a temporally modulated light source lacked a blue component, the eye grew more when presented with low temporal frequencies than high temporal frequencies. Thus, the presence of blue light prevented temporal frequency dependent increases in eye growth. Given that typical indoor illuminants have lower energy at the blue end of the spectrum than the red, it was inferred that this paucity of short wavelength light in indoor illumination may increase the likelihood of human childhood myopia development (Rucker, Color and Temporal Frequency Sensitive Eye Growth in chicks, 2018).

The juvenile eye typically develops until the age of 18 to 21 years, and is accompanied by the progression of myopia. By the time the eye fully matures, it may become severely myopic and difficult to treat. Additionally, a high myopia has been shown to be associated with retinal detachment and other severe pathologies. Therefore, an effective preventive countermeasure for myopia and its progression has the potential to improve the sight of 2 to 5 billion people worldwide by the year 2050. Contemporary interventions to prevent juvenile myopia progression include pharmacologic agents and contact lenses. However, these treatments are less suitable for preventing the emergence of myopia because of the following: the onset of myopia usually occurs before the minimal recommended age for these treatments, the offered treatments may slow the myopia progression, but not eliminate myopia entirely, and these treatments may have considerable side effects.

In general, there are two paradigms striving to prevent myopia or its progression by wearable devices: (i) Orthokeratological remodeling of a contact lens (i.e. using specially designed contact lenses' curvatures to reshape the contour of the cornea) and (ii) modifying optical power distribution within progressive addition/multifocal lenses by inducing defocus in peripheral regions of the lens. A multitude of products and techniques being developed are based on these two paradigms, or their combination. Eye lens remodeling can be achieved by hard contact lenses, and peripheral defocus using multifocal lenses can be achieved by either contact lenses, or by eyeglasses. However, both paradigms produce mixed results.

GENERAL DESCRIPTION

There is a need in the art for a novel approach for treating eye disorders, in particular preventing the emergence or the progression of myopia (i.e. mitigation of the myopia propagation). In this connection, it should be understood that myopia prevalence is increasing globally and is close to epidemic status. As described above, the known techniques of the kind specified, i.e. the use of specially designed contact lenses' curvatures and the use of peripheral defocus in a progressive/multifocal lens, do not provide an effective solution.

With regard to peripheral defocus, the following should be noted. While the theory assumes that the eye is not in focus across its entire retinal surface simultaneously, it is believed that the peripheral retina can be out of focus, either under or over focused, while the central retina, the fovea, is in sharp focus. Based on this premise, it is speculated that introducing a concentrating lens to the periphery of the field of view, will result in reduction of myopia progression rates. However, the exact details of the required optical power and its distribution across the field of view remains uncertain, and varies from one treatment to the next.

Spectacles and contact lenses based on the peripheral defocus theory have shown only minor improvements in the prevention of myopia in clinical testing. Similarly, orthokeratology should not be considered as a first-line strategy, given the high risk of infectious keratitis and relatively low patient compliance. Currently, atropine ophthalmic drops seem to be the most effective treatment for slowing the progression of myopia, although the exact mechanism and long-term effectiveness of treatment is still uncertain.

It is, therefore, highly desired to provide a novel device for early treatment and/or prevention of myopia and its progression, as well as the treatment of other eye/vision disorders, such as mitigation of astigmatism propagation, and correction of sight impairments. Current market solutions are not sufficiently effective at addressing these needs.

According to the technique of the invention, a novel lens unit is provided, being configured for spectral selective retinal stimulation modulation, which is advantageously a passive modulation effect in the lens of the invention. More specifically, the lens unit comprises a lens substrate having a certain volume defining a front and back surface, wherein the lens unit carries a spectral coder which, when the lens unit is in use, operates as a temporal spectral coder with respect to a portion of input light interacting with the lens unit and reaching the eye. The lens configuration is aimed at mitigation of eye disorder progression, and, in particular, for the mitigation of myopia progression. Therefore, the novel lens unit has a wavelength selective passive retinal modulation for the mitigation of myopia aggravation. The lens unit may be used in a novel eyeglasses having a special pattern defining a periodic spatial modulation of wavelength selective transmittance of the lenses of eyeglasses, such that natural head and eye movement modulate wavelength dependent reception of light on the retina, and thereby initiate and maintain a long term process which mitigates the aggravation of myopia. The term "passive" refers hereinafter to feature of the lens unit, in which, to be operable, no specialized illumination is required.

In some embodiments, the novel lens unit of the present invention is configured to slow the relative rate of eye elongation for juvenile myopes.

It is generally known from a study by Rucker F., Britton S., Spatcher M., and Hanowsky S. "Blue light protects against temporal frequency sensitive refractive changes", published in Invest Ophthalmol in Vis Sci. 2015; 56:6121-6131. DOI:10.1167/iovs.15-17238, that blue light and temporal sensitivity play a role in the emmetropization response. More specifically, it has been shown that illuminants rich in blue light can protect against myopic eye growth when the eye is exposed to slow changes in luminance contrast. In this study, active sinusoidal luminance time modulation of white light with blue or yellow light without blue at 80% contrast, at one of six temporal frequencies: 0, 0.2, 1, 2, 5, 10 Hz was investigated.

As described by (Gaston, 2014), spatial distortion has the potential for increasing overall sensitivity. As such, a grid design enabling spatial distortion of the "flickered" light enables a higher sensitivity to the angular flickering system. It has been shown that the rate of eye elongation increases if there is a deficit of blue light. It is therefore desirable to apply a spectral encoder (e.g. interference filter) that increases the portion of blue light reaching the eye (either by increasing reflection off the back (concave) surface of the lens towards the eye, or by decreasing reflection or increasing transmission of blue light off the front (convex) surface of the lens), thus increasing the overall blue component of the light reaching the eye, and obtaining a more neutral density.

The inventors of the present invention found that by configuring a lens unit (typically spectacles or clip-on lens) with an appropriate spectral selective pattern in the lens unit, an effective, passive and simple in use solution for the problem can be provided. In other words, the invention enables to generate a low frequency flickering signal with novel filter patterns/coating designs when used with natural angular user head and eye motion, and other types of motion. For example, the transmitted and reflected light produce a more neutral density daylight like spectrum by increasing the relative ratio of the blue spectral band through backside and front side reflection (since the solar spectrum has relatively equal proportions of blue and red light). The relative ratio between the transmitted and reflected light is a parameter enabling to control the prevention of the emergence or the progression of myopia. For example, a higher ratio may provide more light in the blue spectral band. As described above, it has been shown that the rate of eye elongation increases if there is a deficit of blue light. Therefore a controlled relative ratio is able to control myopia. The spectral coder may be thus configured as an interference filter applied to part of the back or front side of an ophthalmic lens, forming a geometry of coated regions and uncoated regions that, when worn by a dynamic eyeglasses wearer, transmit or reflect radiation into the eye with flicker temporal frequencies selected to retard eye growth rates. In this connection, it should be noted that, the term "interference filter" refers hereinafter to interference created in a transverse direction to the lateral dimensions of the different regions of the lens unit. As described above, the arrangement of the different regions provides a non-diffractive pattern with respect to the spectra of the light incoming on such an interference filter. For example these temporal frequencies may be the range of between about 0.2 and 20 Hz. In this connection, it should be understood that the range of temporal frequencies has been selected as follows: for example, it has been shown that when a temporally modulated light source lacks a blue component, the eye grew more when presented with low temporal frequencies than high temporal frequencies. Thus, the presence of blue light prevented temporal frequency dependent increases in eye growth, e.g. the presence of a flickering blue light source from 0.1-5 Hz can reduce the progression of Myopia. Temporal contrast sensitivity for human observers has previously been reported to drop to zero (the critical flicker fusion rate) near 65 Hz. Conventional computer screens utilize flickering rates at 2 settings 48 ad 60 Hz beyond the reported sensitivity of the human eye to detect modulation contrast. However, when the modulated light source contains a spatial high frequency edge, for the median viewer, flicker artifacts disappear only over 500 Hz, many times the commonly reported flicker fusion rate. (Lee, 2015) For chickens the CFF (critical fusion flicker) parameter is slightly higher than that of humans (Gaston, 2014), at 71 Hz.

It should be noted that, generally, the present invention can be used with eyeglasses which are not intended for any vision correction. In other words, the spectral selective pattern is provided on/embedded in an eyewear element which may or may not have any vision correction property (e.g. optical power, etc.). Therefore, the terms "lens unit" and "lens" used herein should be interpreted broadly covering also an eyewear element through which the user's eye is exposed to a scene.

According to the technique of the invention a lens unit is provided, the lens unit comprising a lens having a certain volume defining a back surface and a front surface, wherein the lens unit carries a spectral coder which, when the lens unit is in use, operates as a temporal spectral coder with respect to a portion of input light interacting with the lens unit and reaching the eye.

More specifically, the spectral coder includes a spectral selective pattern formed by an array of lens regions of the lens substrate having different spectral properties defining together a predetermined spatial transition profile and spectral and geometrical parameters. The spectral and geometrical parameters include a number of regions of the different wavelength selectivity, lateral shape and size of the regions, wherein the spectral and geometrical parameters of the spectral selective pattern are configured to enable treatment of at least one eye disorder. The spectral selective pattern is configured to induce spectral selective modulation of amount and spectral properties of light reaching a user's eye after interaction with the lens unit. The spectral selective pattern is configured to induce low-frequency temporal changes of the spectral selective modulation resulting from movements of the user's eye. When the lens unit is put in front of the eye in a field of view of the user, it affects, via spectral selective modulation, the amount and spectral properties of the light reaching the user's eye. Due to natural head or eye movements of the user wearing the lens unit with respect to the spatial and spectral pattern carried by the lens unit, and also with respect to ambient light sources to which the eye is exposed, the spectral selective modulations are temporal modulations of typically low frequency.

It should be understood that in such a spectral selective pattern, each region in the array of multiple regions of the spectral selective pattern has a certain wavelength selectivity different to that of adjacent regions. The wavelength selectivity can be described by a certain relation (e.g. ratio) between light responses (reflection and/or transmission) of the region to incident light of different wavelengths.

The parameters of the spectral selective pattern are configured to enable treatment of at least one eye disorder. The different regions of the spectral selective pattern can have different shapes/dimensions. These parameters include spectral distribution/profile, the percentage of surface coverage geometrical features (e.g. the number of regions of different wavelength selectivity, the periodicity or lack thereof, and their lateral shape and size), which all together define the spatial transition profile of the spectral properties/pattern. The spatial transition profile may have a certain variable periodicity along at least one lateral axis of the lens unit. The geometrical shape is not limited to any shape and may include grid, bars (horizontal, vertical), periodic pattern, non-uniform pattern, spiral, or concentric circles.

It should be noted and will be described more specifically further below, that an arrangement of the above different regions provides a non-diffractive pattern. More specifically, the regions of the different spectral properties in the spectral selective pattern are configured and arranged with a low spatial frequency with respect to visual spectra for which the lens is designed (lateral dimensions of the regions with respect to the wavelength of visual spectra). The spectral selective pattern is therefore a non-diffractive pattern.

Thus, according to the technique of the invention, a passive spectral selective spatial pattern is used in a field of view of the user, which results in a spectral selective modulation of the amount and spectral properties of the light reaching the user's eye. It should be understood that these spectral selective modulations are temporal modulations of typically low frequency due to a natural head or eye movements of the user wearing the lens unit with respect to the spatial and spectral pattern (which is carried by the lens unit) and ambient light sources to which the eye is exposed. Such natural head and eye movements with respect to the lens unit and/or with respect to ambient light sources (e.g. during a user's movement or any other activity) generate variation in the amount of light reaching different regions of the eye from different regions of the spectral selective pattern of the lens unit, whereas non-homogeneous distribution of the light interacting with the spectral selective pattern induces the variation. According to the technique of the invention, the spatial pattern induces targeted low frequency temporal modulation of the amount and spectral properties of incoming light, and, in particular embodiments, low frequency modulation of the amount of blue light reaching the eye, thereby enabling the treatment of myopia or other eye disorders. In other words, in some embodiments, the spectral coder may provide an increased retinal exposure to blue light.

In some embodiments, the spectral selective pattern is configured to define a plurality of spatial transitions (e.g. at least three) arranged along at least one lateral axis across the lens unit.

In some embodiments, the spectral selective pattern includes a pattern having a width of at least 5 mm.

In some embodiments, a ratio between different wavelength selectivities measured at different positions of the lens unit, either in transmittance through the lens unit, or in reflection from the back surface of the lens, is at least 2.

In some embodiments, at least one of the front and back surfaces of the lens unit is coated with a coating structure forming the spectral selective pattern. The coating structure may comprise a multi-layered coating structure being configured for coating the back surface of the lens. The multi-layered coating structure may comprise at least one patterned layer comprising the spectral selective pattern.

In some embodiments, the multi-layered coating structure comprises at least one reflective layer having reflective properties being configured to reflect light at wavelengths in the range of about 440 nm to 500 nm. The at least one reflective layer may have a reflection coefficient in the range of about 440 nm to 500 nm being higher than 10%. The reflective layer may have a back surface interfacing an upper surface of the coating structure.

In some embodiments, the at least one reflective layer is patterned.

In some embodiments, the multi-layered coating structure further comprises an anti-reflective layer interfacing the back surface of the lens.

In some embodiments, at least one of the front and back surfaces of the lens unit is tinted with a tinting forming the spectral selective pattern.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 3A-3C is a table showing a non-limiting example of a multi-layered coating structure according to an embodiment of the invention;

FIGS. 5A-5E illustrate different possible examples of spatial patterns;

FIGS. 7B and 7C illustrate how head movement (rotation) produces temporal modulation of the light spectral properties due to the wavelength selectivity of the pattern.

DETAILED DESCRIPTION OF EMBODIMENTS

The present invention provides a novel lens unit for use in eyewear for the mitigation of propagation of myopia. In certain embodiments the lens has negative diopter power to correct present myopia. In some embodiments, the lens unit is configured for vision correction, i.e. formed to correct other or additional sight deficiencies. In other embodiments, the lens unit has no optical power and is used mainly for the mitigation of myopia by providing low frequency modulation of the spectral properties of incident light.

In an embodiment the eyewear is spectacles. In some embodiments eyewear may be, for example, fit-over glasses or clip-on lenses.

Figure 1A:
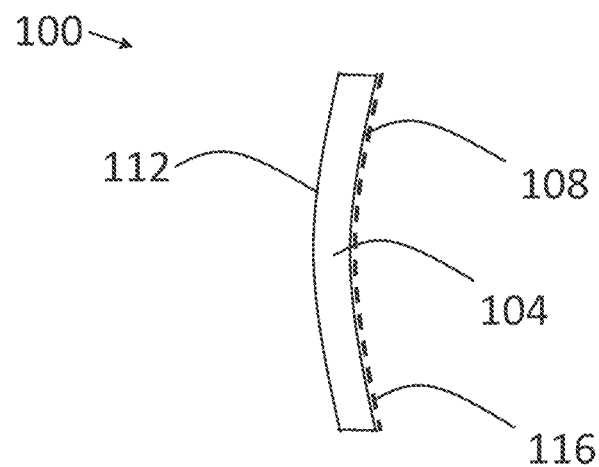
FIGS. 1A-1C illustrates an embodiment of a lens unit according to certain aspects of the invention.
Figure 1B:
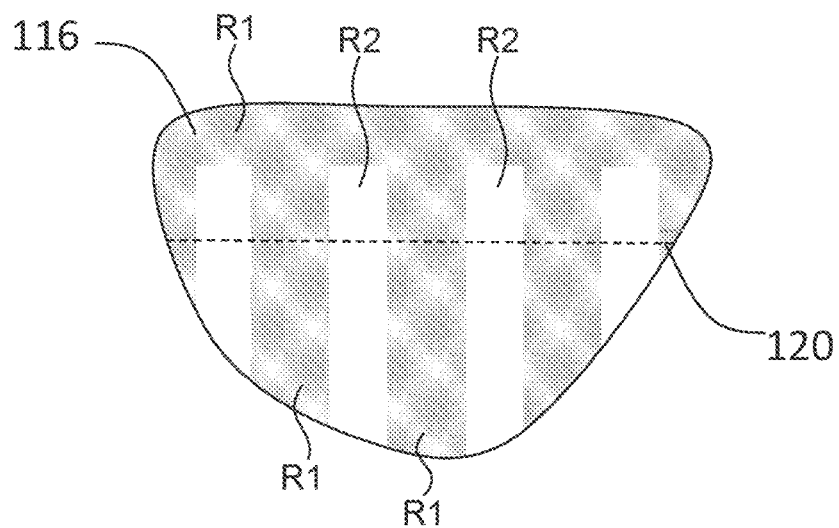
Figure 1C:
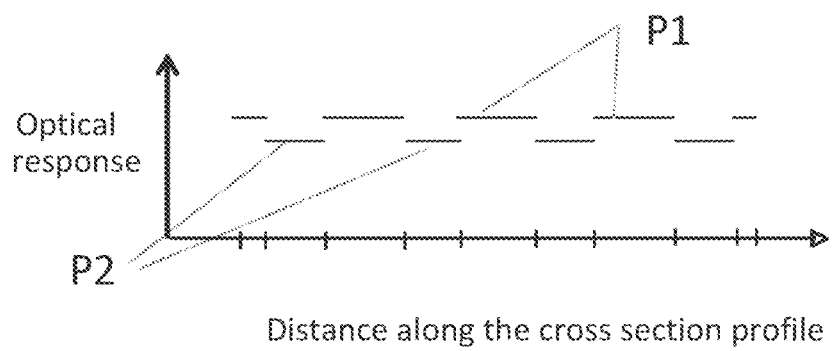

Referring to FIGS. 1A-1C, a specific but not limiting example of some embodiments of the invention is illustrated. In the figures, a lens unit 100 of the invention is exemplified, showing, respectively, side and top views of the lens unit, and distribution of optical properties of the lens unit. The spectral selective wavelength selective pattern of the lens unit may be configured to be used in wearable devices for reducing a rate of myopia progression.

FIG. 1A portrays a schematic (not in scale) vertical cross section through the lens unit 100, showing the lens unit comprising a lens substrate/element defining a certain volume 104 between a back surface 108 and a front surface 112 of the lens unit 100. It should be understood, and also explained above, that the lens substrate is a generally optically transparent element with or without any prescribed optical power. According to the invention, the lens unit 100 carries a spectral coder 116, which in the present non-limiting example is shown as being located on the back surface 108. When the lens unit is in use, spectral coder 116 operates as a temporal spectral coder with respect to a portion of input light interacting with the lens unit 100 and reaching the eye. Spectral coder 116 may comprise a spectral selective pattern formed by an array of regions of the lens substrate having different spectral properties defining together a predetermined spatial transition profile. The different regions of the array may have different sizes, or be the same size. The spectral selective pattern may be configured to induce spectral selective modulation of the amount and spectral properties of light reaching user's eye after interaction with lens unit 100. The spectral selective pattern is configured to induce low-frequency temporal changes of the spectral selective modulation resulting from movements of the user's eye. The spectral selective pattern may be formed on, or embedded in, the lens substrate, using any suitable technique. More specifically, the spectral selective pattern may be implemented as a coating on or as embedded within either the front or back surface, or may be carried within (embedded in) the volume of the lens. Back surface/front surface mirror implementations allow flexibility in controlling parameters of wavefront impinging on the eye. For example, in order to increase the total intensity of a specific band of radiation (e.g. 430 nm-500 nm), a mirror coating can have an increased blue band reflection.

FIG. 1B shows a front view of the lens unit, e.g. from the back surface of the lens unit, exemplifying a particular embodiment/configuration of a spectral selective pattern 116. It should be understood that this illustration is more specific about the pattern configuration, irrespective of whether it is obtained by surface coating or any embedment. Implementing the spectral selective pattern by a patterned back surface coating of the lens unit might be more practical in many applications. In the description below, the spectral selective pattern is described/exemplified as the surface coating, but it should be understood that the principles of the invention need not and should not be limited to this example.

The spectral selective pattern 116 has regions (pattern features) of different spectral properties arranged along at least one lateral axis 120 across the lens unit, i.e. in a lateral plane—regions R1 and R2 of two different spectral properties being shown in this non-limiting example. In other words, each region R1 and R2 in the array of multiple regions of the spectral selective pattern has a certain wavelength selectivity different to that of adjacent regions. The certain wavelength selectivity may be defined by a certain relation between a light response of the region and incident light of different wavelengths. The spectral and geometrical parameters of the spectral selective pattern may be configured to enable treatment of the at least one eye disorder. The spectral and geometrical parameters may include a number of regions of the different wavelength selectivity, lateral shape, and size of the regions. The regions of the different spectral properties in the spectral selective pattern may be configured and arranged with a low spatial frequency with respect to visual spectra for which the lens unit 100 is designed. The spectral selective pattern is therefore a non-diffractive pattern. It should be understood that in some embodiments such a pattern is in the form of regions of at least first spectral properties spaced by (surrounded by) the regions of at least second different spectral properties. These may be discrete regions of different spectral properties (as exemplified in FIG. 1B), or regions with smooth/continuous transition between them. The spectral selective pattern is thus configured to define a plurality of spatial transitions arranged along at least one lateral axis of the lens unit. The lateral dimensions of the regions of different spectral properties may or may not be the same; likewise, the lateral dimensions of the multiple regions of the same optical property may or may not be the same.

It should also be noted that the pattern is such that the regions of different spectral properties are arranged with a low spatial frequency with respect to visual spectra for which the lens is designed (i.e. lateral dimensions of the regions are larger, and even much larger, than the wavelength of visual spectra). In other words, the pattern is substantially non-diffractive with respect to the spectra for which the lens unit is designed.

Thus, in the present non-limiting example, the spectral selective pattern 116 is implemented as a coating being a multi-layered coating structure. The illustrated spectral selective pattern comprises coated regions R1 (having a first spectral property) on the lens designated in gray, and uncoated regions R2 designated in white (being regions of the lens having a second spectral property).

Spectral selective pattern 116 may be described for example by a geometrical shape (lateral structure) of the regions of certain spectral properties, e.g. the regions on which the coating is applied. The regions of the spectral selective pattern may comprise two or more regions having certain geometrical shapes including at least one of an elongated substantially rectangular shape, and a substantially ring-like shape. For example, the substantially ring-like shaped regions may include at least one of oval, circle and ellipse. More specifically, according to the illustrated embodiment, the pattern may comprise regions having elongated geometrical shapes, rectangular in this case, along the vertical direction in the plane of the lens (the lateral plane). Defining width as generally orthogonal to the elongation direction of a geometrical shape, the elongated shapes may have a width (lateral dimension) of at least 5 mm, or even less. In a specific and non-limiting example, the width of the coated regions may be in the range of about 0.5-20 mm. For example, the width of the coated regions may be 1 mm, 5 mm, 7 mm or 10 mm. Some other pattern configurations which may be applied are illustrated in and described below with reference to FIG. 5A-5E.

As may be noted for the specific embodiment illustrated in FIG. 1B, the geometrical shape of the spectral selective pattern has four separated uncoated regions R2 partially surrounded by one continuous coated region R1. Generally, the patterned lens unit determines certain distribution of optical properties of the lens unit with respect to light to which the lens unit is exposed. Such optical properties may be described as spectral transmission and/or reflection response of the lens unit.

Several aspects of the optical properties consequent of the shape of the spectral selective pattern may be realized if the optical or spectral response profile along a cross section or a line in the lens plane/surface is considered. The spectral selective pattern may be characterized by its optical response, the reflectance from the lens unit, or transmittance through the lens unit at different wavelengths or wavelength (spectral) bands and at different regions thereof. The reflectance or transmittance may be expressed for rays parallel to the lens optical axis, or for rays at a normal angle to the lens surface.

Change in the optical response from one point to another in the lens plane may also be described by considering the profile of the respective response as it varies along the lens unit. Consider, for example the optical response variation along a lateral axis 120 crossing the lens as shown in FIG. 1B. Other axes/lines may be considered as well, providing additional information on the spatial variance of the optical response of the lens unit. As exemplified in FIG. 1B, lateral axis 120 passes through four uncoated regions R2 and five coated regions R1.

FIG. 1C qualitatively illustrates the optical response as it varies along the lens at the position of lateral axis 120. In the present example, the optical response is demonstrated by reflection properties of the lens with respect to ambient light (visual spectra). The optical properties' profile has a first, lower reflection, portions P2 corresponding to the reflection from the uncoated regions R2 of the pattern which have a first fixed width (lateral dimension) of about 5 mm, and has second, higher reflection portions P1 corresponding to the reflection from the coated regions R1 which have varying widths, e.g. about 3 mm width at the edges (periphery) of the lens and about 7 mm in the internal (central) section of the lens.

The pattern creation on/in the lens may generally be performed using any suitable technique. Also, patterning by selective coating is one of many possible examples of such pattern creation.

A coating process according to an embodiment of the invention and the resulting spectral response, are described below with reference to FIGS. 2, 3 and 4.

Figure 2:
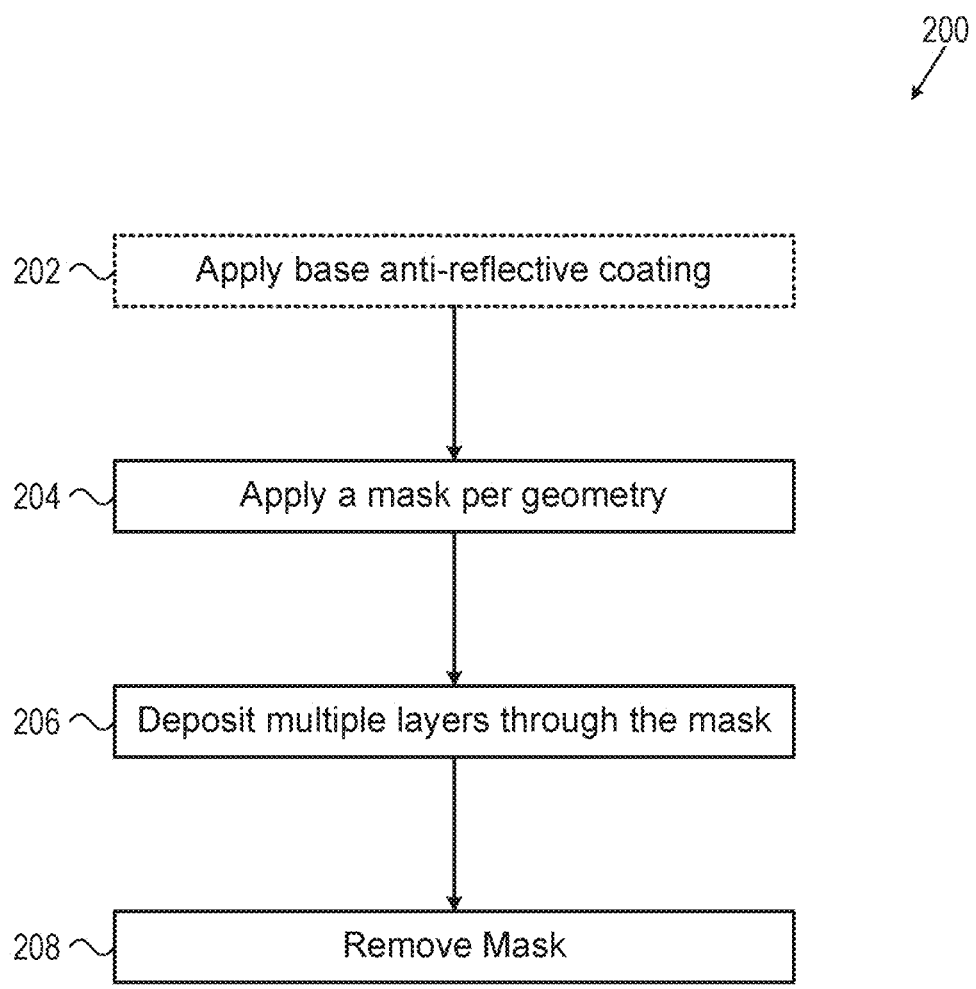
FIG. 2 exemplifies a process of manufacturing a lens unit according to certain aspects of the invention.

FIG. 2 outlines a possible process 200 to generate a spectral coder according to certain embodiments of the invention. Thus, according to certain embodiments, a process is provided for manufacturing a lens unit according to the invention, the process comprising forming a multi-layered pattern of regions of different spectral selective responses on at least one of the lens substrate surfaces and defining together a predetermined spatial transition profile. Process 200 may comprise optionally in 202 applying a base anti-reflective coating, in 204 preparing and forming a mask on the lens substrate or the respectively anti-reflective coated surface, in 206 successively forming multiple layers by deposition of multiple layers on the masked lens surface or the respectively anti-reflective coated surface, in 208 performing mask removal and cleaning of the lens surface. For example, a back surface mirror pattern may be generated.

More specifically, optionally in 202, a base anti-reflective coating is applied to the entire surface of the lens (no pattern). An anti-reflective coating is a type of optical coating applied to the surface of lenses and other optical elements aimed at reducing reflection to certain spectra, e.g. visual spectra for the purposes of the present application. Such coatings typically include multiple layers of evaporated/sputtered materials with alternating high and low refractive indices. Standard ophthalmic grade coatings reduce normal incident reflection to about 1% to 2%, while the normal incident reflection of uncoated surfaces of lenses, which typically have refractive indices above 1.5 and even above 1.6, are in the range of 4% to 5% per surface. For example, the coating may be essentially a grating. In this case, it is desired that the difference between each functional layer is maximal. This first step may increase the gap between a coated blue reflector (5-30% reflection) and an uncoated surface. Typical anti-reflective coatings are adapted for different lens materials, and have a low reflectivity, ranging between 1% and 2%.

In several embodiments of the invention, the coating process providing spectral selective pattern may be adapted to apply multi-layered coating structures (as described below) on top of the above-described anti-reflective coating.

In 204, a masking process is applied, in order to further perform material deposition by blocking certain areas with a patterning mask. Masking techniques may be performed, inter alia, by printing, marking, taping, plate masking or other techniques. Generally, such masks may be separate physical elements (plate masking); however, practically, coating using vapor deposition (e.g. CVD or PVD), utilizes a masking pattern deposited on the surface to be further coated. Generally, a specifically designed mask is used to block selected regions in a manner to protect them from interaction with a material being deposited, in the 206 deposition process. Mask geometry (i.e. a pattern of blocking and transmitting regions) is defined according to a predetermined pattern to be obtained on the lens (referring back to FIG. 1B by way of an example, an appropriate mask may comprise four separate rectangular regions corresponding to the uncoated regions R2 of the pattern on the lens).

In 206, multiple layers, forming together the desired spectral selective optical coating, are successively applied/deposited to the masked lens surface, i.e. to the anti-reflective coating on the surface of the lens in the present example. It should be noted that the provision of any base anti-reflective coating is generally optional, and the multi-layered spectral selective optical coating is designed either to be applied directly on the lens surface, or to be compatible with and to be applied on, the base anti-reflective coating. In certain embodiments, the application of the multilayered spectral selective coating structure provides an increased reflectance of the selected spectral ranges in the unmasked regions (regions not blocked by the mask). Examples of such multi-layered spectral selective coating are provided in reference to FIG. 3.

According to certain embodiments, including those where the back surface of the lens unit is to be patterned, the use of a base anti-reflective coating and the spectral selective coating pattern thereon, increases the contrast between regions that are coated with the spectral selective reflective multi-layered coating structure (regions R1 in FIG. 1B) and regions R2 which are not coated with the spectral selective reflective multi-layered coating structure.

In 208, the mask is removed. According to certain embodiments, mask removal can be performed via selective material removal process, through the use of a combination of different processes, using, inter alia, a wet chemical process, an oxidative process, a plasma process, or a mechanical process. Mask removal results in clean surfaces, leaving the underlying surface of the lens, or of the respectively anti-reflective coated surface, intact.

Optionally, further coating steps may be performed, for example, an application of an anti-smudge layer through thermal evaporation or other processes such as dip coating, spin coating or spray coating or cloth wiping of a chemical linker compound possessing hydrophobic or oleophobic properties.

FIGS. 3A-3C provide details of non-limiting examples of multi-layered spectral selective coatings suitable to be used in the invention. More specifically, three examples of interchangeable coatings (referred to in the figures as caps) are provided for the same base being made of layers of silicon dioxide ($SiO_2$) and of titanium dioxide ($TiO_2$). The tables provide a possible order in which the coating layers are applied, their possible materials, and their physical thickness. More specifically FIG. 3A shows an example having 16% of light reflected at the wavelength 450 nm (i.e. peak reflectance wavelength). FIG. 3B shows an example having 23% of light reflected at the wavelength 450 nm. FIG. 3C shows an example having 32% of light reflected at the wavelength 450 nm.

Figure 4A:
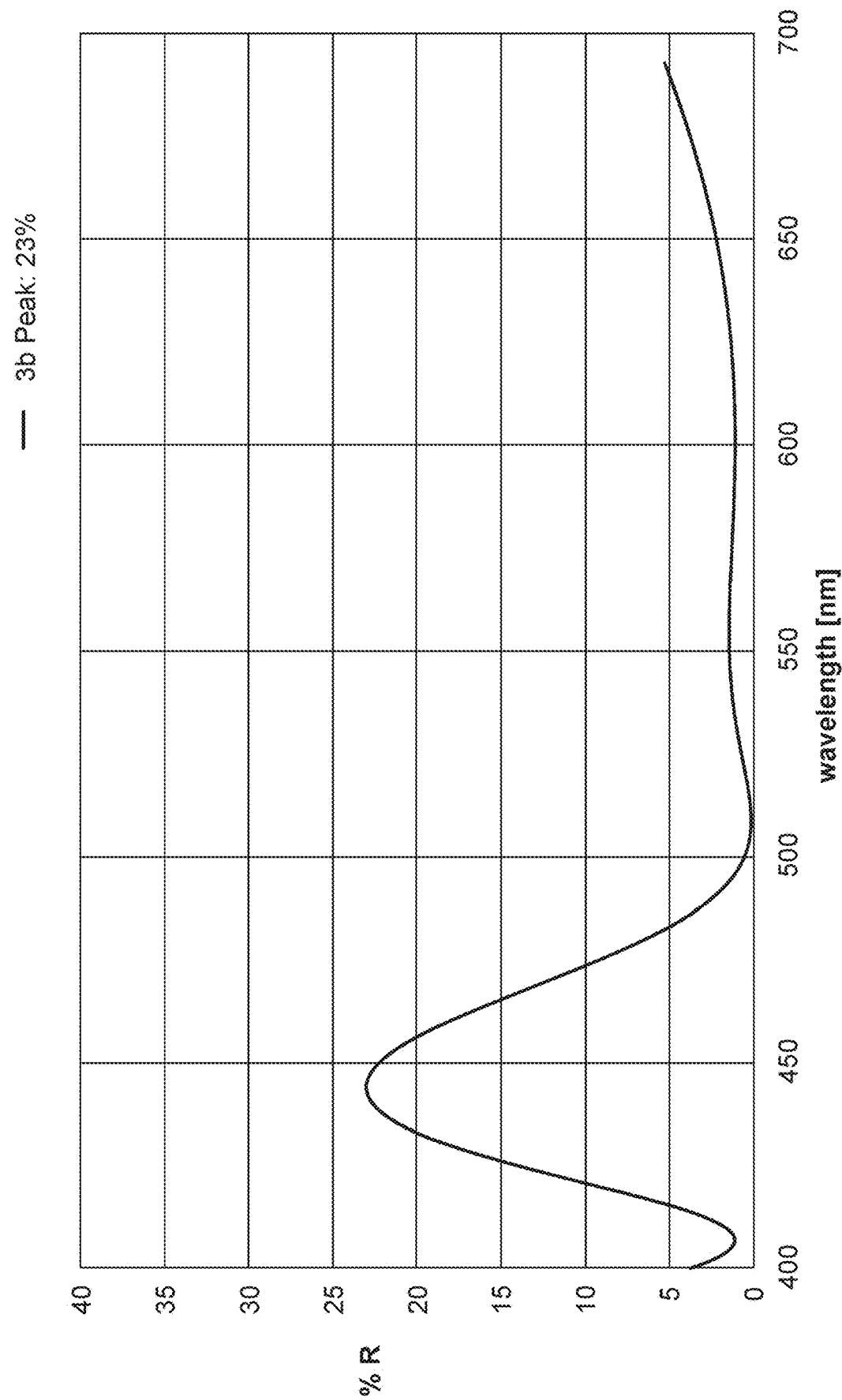
FIGS. 4A and 4B provide calculated reflective properties of the multi-layered coating structure of FIGS. 3A-3C.

FIG. 4A provides a graphical representation of the spectral response of the resulted (coated) region of the lens unit (substrate), which, in the present example (as shown in the FIG. 3B), is a plastic material with refractive index 1.6. As evident from FIG. 4A the reflectance of the so-produced coated lens region is about 23% for wavelengths of about 450 nm and is about 2.5% for wavelengths of about 625 nm.

Turning back to FIG. 1B and considering the reflective spectral response along lateral axis 120 of the lens carrying the spectral selective pattern utilizing the above-described multi-layered coating structure, it is evident that the pattern having different regions defines a profile having a plurality of spatial transitions, where each region has a certain wavelength selectivity being a ratio between reflection or transmission of light at different spectral bands. According to the illustrated embodiment of pattern 116, there are nine such spatial transitions along lateral axis 120 between the relatively high reflectance and relatively low reflectance for blue light (230-490 nm) impinging on the patterned plane (e.g. back surface) of the lens unit. One of the advantages of coatings on the back surface (i.e. the eye-facing surface of the lens) is that they are less likely to scratch due to reduced exposure to abrasive environmental exposure.

In general, and in line with further analysis below, the spectrally selective pattern geometry may be designed under design constraints that affect the number of spatial transitions along a certain line (e.g. lateral)/axis (e.g. meridian) of the lens unit. According to several embodiments, there is at least one line/axis along the lens unit, such that there are at least three spatial transitions, preferably at least five spatial transitions or more between different spectral responses, i.e. between the adjacent regions of different spectral responses. Further, according to other design constraints, the pattern shape may be constrained so that there is no such line/axis along the lens unit for which there are more than 21 spatial transitions, preferably no more than 15 spatial transitions, and more preferably no more than 9 spatial transitions.

The following is a brief description of how the spectral/wavelength selectivity of different regions of the lens unit can be measured.

Continuing with the above example and the approximate values of reflectance for light normally incident on the back surface of the lens unit at wavelengths of about 450 nm and 625 nm, the spectral selectivity can be described. The ratio between the reflectance in the coated regions and the uncoated regions at 450 nm is about 23%:1.5% or about 15. However, the reflectance in other spectral bands also varies as a result of the application of spectrally selective coating. Therefore, in some cases it is more appropriate to consider a refined selectivity measure which is normalized by the response in a second wavelength or spectral band, thus for example the ratio considered above can be normalized by reflectance at about 625 nm. Performing this normalization separately in the different regions of the spectral selective pattern and calculating the normalized ratio provides a refined selectivity measure. The refined selectivity measure may be calculated for the response (the optical property) which may be either reflectance or transmission as follows:

The refined selectivity measure may be defined as the response in a first wavelength band in a first region, divided by the response in a second wavelength band in a first region. Alternatively, the refined selectivity measure may also be defined as the response in a first wavelength band in a second region, divided by the response in a second wavelength band in a second region.

Taking into account the concrete example described above, and the specific approximate values provided above for the reflection coefficients for normal incident light at 440 nm and 625 nm from the back surface of the lens unit, the spectral selectivity measure is about (23%:2.5%)/(1.7%:1.5%); that is about 8. As mentioned above, the refined spectral selectivity measure may be used also with respect to a spectrally selective transmission response, and also may be used with respect to a combination thereof.

Figure 4B:
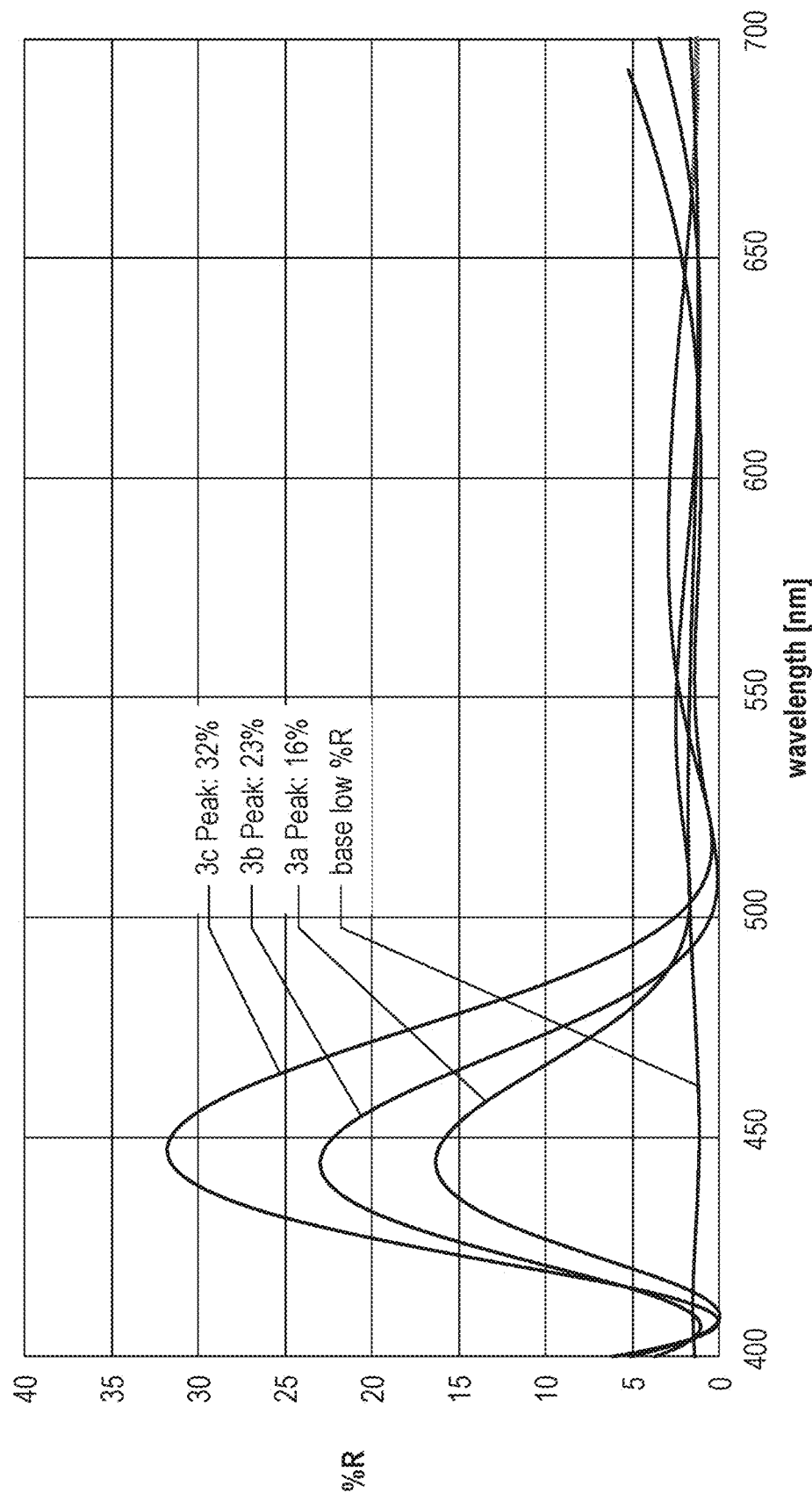

FIG. 4B provides a graphical representation of several additional examples of spectral selective coatings graphically represented by spectral response of the resulted (coated) region of the lens unit (substrate), where the graphs represent the reflectance as function of the wavelength. For these examples, the spectral selectivity ratio (i.e. a ratio between different wavelength selectivities measured at different positions on the lens unit) and the refined spectral selectivity measure, are similar. In these examples, they are in the range between 2 and 8.

Thus, according to certain embodiments, the coating structure comprises a multi-layered coating structure being configured for coating the back surface of the lens, the multi-layered coating structure comprising at least one patterned layer comprising the spectral selective pattern. According to some embodiments, the multi-layered coating structure comprises at least one reflective layer having reflective properties being configured to reflect light at wavelengths in the range of about 400 nm to 500 nm. In other words, the invention increases the overall exposure of the eye to blue light. For example, the blue wavelength range is $\tilde{\lambda}$peak=465 nm (half-band width 25 nm=>440 nm to 490 nm). According to such embodiments the at least one reflective layer is patterned. Further, according to such embodiments, the at least one reflective layer has a reflection coefficient in the range of about 440 nm to 500 nm being higher than 10%, preferably higher than 20%, and, more preferably, higher than 25%. According to various embodiments the multi-layered coating structure of the lens unit further comprises an anti-reflective layer interfacing the back surface of the lens.

According to certain embodiments, production of the spectral pattern can be performed by tinting the lens (substrate) according to specific geometrical and spectral parameters of the pattern to be produced in the lens unit. According to such embodiments, the process 200 may be modified and reordered as follows:

In step 1, a masking process is applied in order to further perform tinting through a printed/template patterning mask. Masking techniques may be performed as discussed above. Mask geometry is defined according to a predefined pattern to obtain a certain pattern geometry.

In step 2, a tint is applied, whereas, for example, tint may be successively applied by partial immersion in tint baths, typically at elevated temperatures for controlled and varying time periods. An immersion process may be used, and partial immersion for different periods of different regions of the lens may allow for forming a tint gradient pattern. As a result of different levels of tinting, the regions of different spectral properties may be created, and the spectral properties, defining either reflectance or transmission response in the respective point/site/location in the lens plane, may generate a spectrally gradient pattern formed by gradually varying spectral properties and, accordingly, gradually varying spectral response (as an alternative to a discrete spectral selective pattern). In general, the application of gradient patterns may smooth the transitions in the optical response between different regions of the lens and reduce higher frequency components content in the generated spectral selective modulation of light directed to the eye, which is further discussed below.

In step 3, the mask is removed. According to certain embodiments, the mask removal can be performed via selective material removal process, using, inter alia, a wet chemical process, an oxidative process, a plasma process or a mechanical process. Mask removal results in clean surfaces, leaving the underlying surface of the lens surface intact, with the tinted pattern being embedded within the lens volume.

In step 4, which in some embodiments is optional, an anti-reflective coating is applied to the entire surface of the lens. The anti-reflective coating may be similar to the anti-reflective coating described above. Applying a tint may be performed with a reflective tint for a reflective spectral selective response, or with spectral selective absorbing tint to generate a transmission spectral selective response. Application of an anti-reflective coating may be performed before or after the tinting procedure, depending on the chemical and physical characteristics of the tinting. For example, an anti-reflective coating can be tinted by printing a tinted layer on the top surface of the anti-reflective coating.

Turning to FIGS. 5A to 5E, several examples of different geometrical shapes of spectral selective patterns are illustrated in a self-explanatory manner. The figures show different pattern configurations. Common to all the examples, different possible coating or tinting patterns may be applied on the front and/or back surface of the lens and/or in the volume thereof. The lateral resolution of the pattern (shapes and sizes of the pattern features) is limited by the resolution of the masking process, which, in general, may provide patterns with minimal features smaller than 1 mm. However, as noted above, the lateral geometrical features of the spectral selective regions of the pattern are larger, or much larger (orders of magnitude), than the respective visual wavelengths, therefore the light interaction with the spectral selective pattern can be defined as generally non-diffractive.

In FIGS. 5A to 5C and 5E, the illustrated spectral selective patterns comprise an array of discrete spaced-apart regions having first spectral property R1 on the lens spaced by regions R2 being regions of the lens having second spectral property. For the sake of illustration only, regions R1 (designated in gray) and R2 (designated in white), are mentioned in FIG. 5A, however the same principles apply to the different figures. Also, in these examples, the spatial transition profile has a certain variable periodicity along at least one lateral axis e.g. the regions of the same wavelength selectivity have different geometries, and, accordingly the patterns have variable periodicity. FIG. 5A illustrates a pattern, the features of which are inclined with respect to the major lateral axes of the lens unit. FIGS. 5B and 5C illustrate generally "straight" patterns with elongated features extending, respectively, along horizontal and vertical axes. In both examples, the pattern is accommodated within the lens such that different side regions/portions of the lens substrate are, respectively, 'nasal' and 'temporal' portions of the lens with respect to a face center (nose), and have different sub-patterns defined by different configurations and arrangement of the features of the spectral pattern. Such geometrical patterns, if applied on a back surface of a lens unit as a multi-layered coating structure according to the example described above in reference to FIG. 3, FIG. 4A and FIG. 4B, provide higher reflective power for blue light interacting with the 'distal' portions of the back surface of the lens unit, as compared to a pattern that is more homogeneously arranged on the lens surface.

FIG. 5D exemplifies a somewhat different spectral pattern configuration, which, similar to that of FIG. 5A, is inclined with respect to the major axes of the lens unit, but has a gradually varying spectral profile across the lens, thus providing a smooth spatial transition profile.

In the figure, this is illustrated by different gray levels in different positions in the illustrated lens. The gradient forms a smooth transition from a first spectral property on the lens designated in dark gray, to regions of the lens having a second spectral property, designated in white. The transition profile (between zones of different transmission) generates the desired flicker mentioned above. Such a pattern may be produced by different methods including, inter alia, tinting, and, in particular, through an immersion process using partial immersion to provide partial tinting. The spectral selective pattern is thus adapted to create a wavelength dependent flicker, through relative movement of at least one of user's eyes and head with respect to the environment. The wavelength dependent flicker may be in a frequency range of about 0.2 Hz to 20 Hz.

In general, the spectrally selective patterns may be personalized, either to improve their effectiveness in mitigating the propagation of an eye disorder, to correct specific sight deficiencies in each of the different eyes, or to provide other values such as commercial values or charm, e.g. to provide a custom shape that is attractive to young children, to provide indication of manufacturing, or to enable a visual trademark on the lens unit.

FIG. 5E exemplifies the pattern in the form of regions of first spectral property arranged in a concentric-like fashion being spaced by the regions of the second optical properties. More specifically, the pattern comprises closed-loop or almost closed loop regions of generally elliptical (or almost elliptical) geometry and having certain widths. For example, the width of at least one of the elliptical regions is at least 5 mm, or preferably at least 3 mm.

An example of a non-symmetric pattern which may be applied according to different embodiments, and which comprises low spatial frequency components, is provided in FIG. 5E.

It should be emphasized that by selecting an appropriate non-symmetrical pattern, spectral selective light modulation may be generated through different motions (rotations or translations), even if the light is rather uniform.

Figure 6:
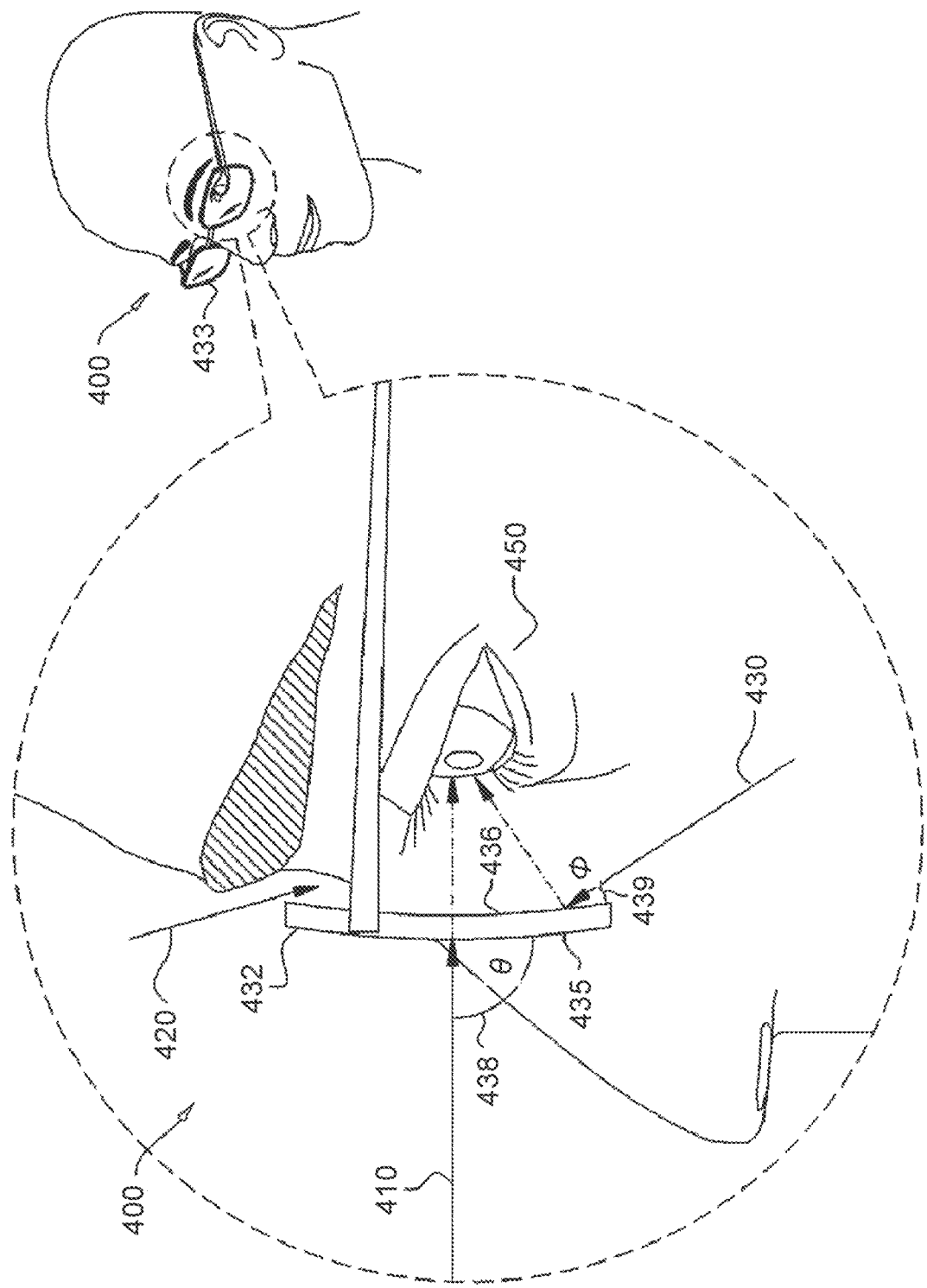
FIG. 6 illustrates how light reaches the eye through a lens unit assembled as part of eyewear, through transmission, reflection and directly through the gaps between the lens assembly and eye.

FIG. 6 illustrates a light propagation scheme through the lens unit 432 of the invention towards a user's eyes. More specifically, the figures illustrate how radiation can reach the eye of a user wearing eyewear comprising the lens unit 432. FIG. 6 schematically illustrates several input light propagation paths towards an eye 450, wherein some of these paths interact with the lens unit (e.g. involving transmission through the lens unit or reflection from the lens unit towards the eye), and some paths are so-called direct paths which do not interact with the lens unit. The several input light propagation paths are possibly transmitted or reflected off a lens unit 432 of some eyewear 400. Light path 410 illustrates that input light which originated at a scene can be transmitted through the lens unit: the input light impinges on the front surface of the lens unit at incident angle θ, successively passes through the front surface 435, through the volume 433 and back surface 436 and is directed to the eye, according to the lens optical power, at angle φ439. For example, the light propagation paths can travel along a direct pathway 410 through the front (or convex) side 435 of the lens unit 432 at an angle of incidence (AOI), θ 438, for example, 90 degrees, through the back surface 436 (or concave side) of the lens unit 432, at an angle of incidence, p 439, and into the eye 450. The light propagation paths can also follow a pathway 430 that includes reflection off of the back surface 436 of the lens 432 and into the eye 450. More specifically, path 430 schematically illustrates light impinging on the back surface 436 at angle 90-<b and reflected into the eye. The light propagation paths can follow a pathway 420 passing into the eye 450 around the frame 433. Path 420 illustrates that light can also directly reach the eye passing through the gap between the lens unit and the head without involving interaction with the lens unit. The light propagation path 430 reflected off the back surface 436 of the lens unit 432 can be modulated with a spectral coder (e.g. an interference filter narrow band mirror), thereby controlling the wavelength of radiation reflected off the back surface of the lens 436 into the eye. For example, a mirror mostly reflecting a band between 400 nm and 450 nm, but mostly transmitting all other wavelengths, can be applied to the back surface of the lens 436, increasing the total radiation between 400-450 nm reaching the eye.

The amount of light following the various paths depends also on the respective position and orientation of the user and his eyes (compound positioning of the head, the eyes, the eyewear and lens unit, and of potential occlusions) with respect to light sources and ambient lighting conditions in the environment in which the user is situated. To illustrate the effect of the spectral selective pattern on the amount and spectral properties of light reaching the eye, relative movements and changes in the relative compound positioning of the above listed elements involved should be considered. In particular, several relative movement examples are outlined as follows: (i) head rotation with respect to a certain point-like light source and how it affects light reflection from the back surface of the lens unit reaching the eye, (ii) eye rotation and how it affects light reflection from the back surface of the lens unit reaching the eye, and (iii) translational movement between the user and a light source and how it affects light transmitted to the eye. For simplicity, a point-like light source is considered. These simplified examples are for explanation purposes and can be generalized to compound movement, to general lighting conditions, and to different types of spectral selective patterns. Various light sources may be used in an indoor environment. For example, the light source may be light emitted from a computer screen, light emitted from an overhead fixture, or sunlight entering through a window. These different light sources are oriented differently with respect to the eyewear. For example, the light emitted from a computer screen is transmitted through the lens unit towards the eye. Light emitted from an overhead fixture may be transmitted through the lens unit, or reflected off the concave side of the lens unit towards the eye, depending on the location of the fixture with respect to the lens and eye. In indoor settings, these light sources of the input light (e.g. window, lamps or media or computer screens) are relatively static as fixtures, so when an eyeglasses wearer moves his/her head or eyes, the position on the lens, through which the light rays enter the eye, varies. With a spatially variable selective interference filter over the surface of the lens, the rays of light transmitted through a coated area on the lens unit are partially or fully reflected. The rays transmitted through an uncoated area are reflected or transmitted differently. This induces a "flicker", or a variability in the signal reaching the eye. It is possible to generate low frequencies (<1 Hz) as a result of changes in angular reflection/transmission of indoor light sources. For explanation purposes, consider first two simplified cases of relative motion: (i) coupled head and eye rotation (moving together) and (ii) independent eye rotation. For coupled head and eye rotation and a sufficiently distant light source, it is also possible to consider, for the sake of explanation, that the spatial distribution of input light incident on the back surface of the lens, changes its position on the back surface of the lens according to head rotation. Thus, the modulation of the light reflected into the eye may be mainly according to head rotation, eye rotation and properties of the spatially variable selective interference filter formed on the back surface of the lens.

Figure 7A:
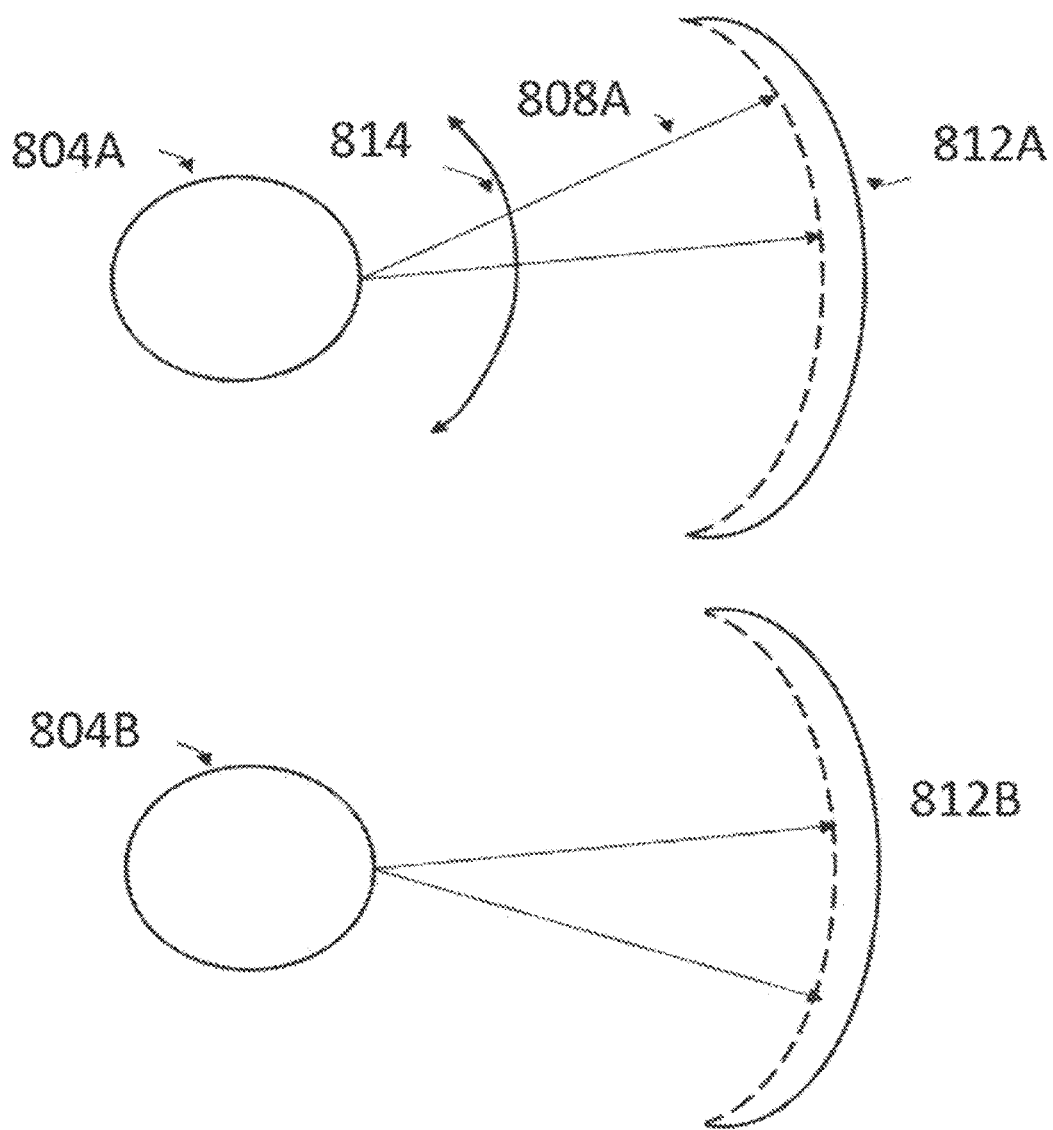
FIG. 7A illustrates how eye movement (rotation) produces temporal modulation of the light spectral properties due to the wavelength selectivity of the pattern.

Reference is made to FIG. 7A representing a schematic diagram of an eye view of a left and right eye (804A, 804B respectively) and respective lens units 812A and 812B. In this example, each lens unit is configured as a multi-layered coating structure applied to the eye-facing, or back surface of the lens (sometimes also referred to as the concave side, or the eye-facing side). Upon eye rotation, the gaze direction (808A) rotates with the eye in a direction represented in arrow 814, for example when reading or performing a visual scanning task. As such, the eye experiences the light entering the lens unit with variable exposure to light, due to the multi-layered coating structure, which varies over the surface of the lens.

Reference is made to FIGS. 7B and 7C representing schematic diagrams of changes position from which light propagation may be reflected into the eye due to head rotation. In this specific and non-limiting example, the light source 820 is a generic light source, and is static. More specifically, FIGS. 7B and 7C schematically illustrate the user's head 800 and lens units 812A and 812B (spectral patterns), each being positioned in front of left and right eyes 804A and 804B, and show, respectively, two different relative orientations between the eyes and the input light propagation paths from the light source 820, resulting from the "compound movement". Such movement actually results in a change of the relative position of the line of sights 808A and 808B and 810A and 810B in FIG. 7B and FIG. 7C respectively. The lens units 812A and 812B positioned in front of the eyes are depicted here by dashed curves, which schematically indicate a pattern geometry. Note that FIG. 7B and FIG. 7C are schematic and for explanation purposes exaggerate different dimensions. Also note that in the figure, the angle of reflection is not equal to the angle of incidence, and that, although not illustrated, light source(s) may be at different heights, therefore the incidence and reflection angle are not appropriately represented. Consider a spectral selective reflective pattern coated on the back surface of each lens unit. FIG. 7B depicts a first position and orientation of the head and the eyes with respect to a point light source 820. FIG. 7C depicts a rotation of the head and eyes to a second position. If the head rotates, the position on the lens unit from which a ray reflects, changes. Continuous motion results in a varying reflectance signal, depending on the velocity of the head rotation, and the reflectance pattern on the lens unit.

Referring to FIG. 7B, the light propagation path 4201 schematically illustrates the path of light from the light source to the back surface of the lens unit. According to this example, the incident light interacts with the first region R1 of the spectral selective pattern formed on the back surface, and reflects into the eye through path 4202, as compared to a situation with different relative orientations between the input light propagation path and the spectral pattern. This alternative situation is shown in FIG. 7C, and is a result of a rotation of the head and eyes (compound movement). As shown, in this case, the input light from the light propagation path 4201' impinges on the back surface of the lens unit and interacts with the region R2 of the pattern. Thus, in the simplest case of the substantially same amount of light incident on the lens unit in both relative orientations of FIGS. 7B and 7C, the amount and spectral features of light reaching the eye in both cases, are different. Thus, as a result of movement of the head and eyes with respect to the lighting, and as a function of the spectral selective pattern in front of the eye, a temporal modulation of the amount of wavelength specific light reaching the eye, is generated.

Further, the distribution of light impinging on the back surface of the lens unit may not be homogeneous, e.g. due to partial occlusions of the back surface of the lens unit by the head. Also, the spectral selective pattern may be not symmetric. Consequently, rotation of the head changes the relative amount of light falling on the first and second regions of the spectral selective pattern, and thus further affects a change in the amount of light reflected into the eye.

Rotation/movement of the eyes, independent of head rotation, and accordingly independent from lens unit rotation, practically does not affect the distribution of the input light impinging on the lens unit. However, such eye rotation does affect the light signal (amount and spectra) reaching the eyes. Generally, it should be noted that light falling on the lens unit may be, and in most cases is, non-uniformly distributed on the lens unit surface. This may be due to different factors, such as the position of different light sources with respect to the lens unit, obstructions (e.g. by the nose) or possibly non-planarity of any lens unit surfaces. When considering the distribution of light falling on the back surface of the lens unit, this may be even more pronounced, e.g. due to more prominent obstacles. Consequently, the distribution of light incident on different features/regions of the spectral selective pattern may be not uniform. When considering light reflection from the back surface of the lens unit, and how light reaching the eye is modulated due to eye rotation, it may be beneficial to consider a combined effect formed by the effect of (i) non-uniformity of the distribution of light on the surface of the lens unit and (ii) lateral non-uniformity of the distribution of wavelength selective regions of the spectral pattern. In this case, i.e. the case where either the distribution of light or that the pattern on the lens unit is non-uniform, the rotation of the eyes with respect to the spectral pattern, for a given input light propagation path on the spectral pattern, results in a change in the amount of light, at specific spectral bands, directed into the eye from the lens unit. Specifically, in such a case, for the spectrally selective pattern, rotation of the eyes with respect to the pattern, results in a temporal modulation of the amount of reflected light, predominantly at the specific waveband for which the spectrally selective pattern/coating is designed. This temporal modulation depends on the rate of rotation/movement of the eye, and also on the non-uniformity of the combined light distribution.

Similarly, considering light transmission through the lens unit and how in such a case light reaching the eye is temporally modulated due to eye rotation, it may be useful to consider (i) non-uniformity of the distribution of light on the front surface of the lens unit and (ii) lateral non-uniformity of the distribution of wavelength selective regions of the spectral pattern.

The above described example of FIGS. 7B and 7C demonstrates how the eye rotation (a movement example) affects the temporal spectral coding of the input light reaching the eye. In this non-limiting example, the temporal spectral coding is applied to the input light being reflected from the lens unit (its back surface) towards the eye.

Figure 8A:
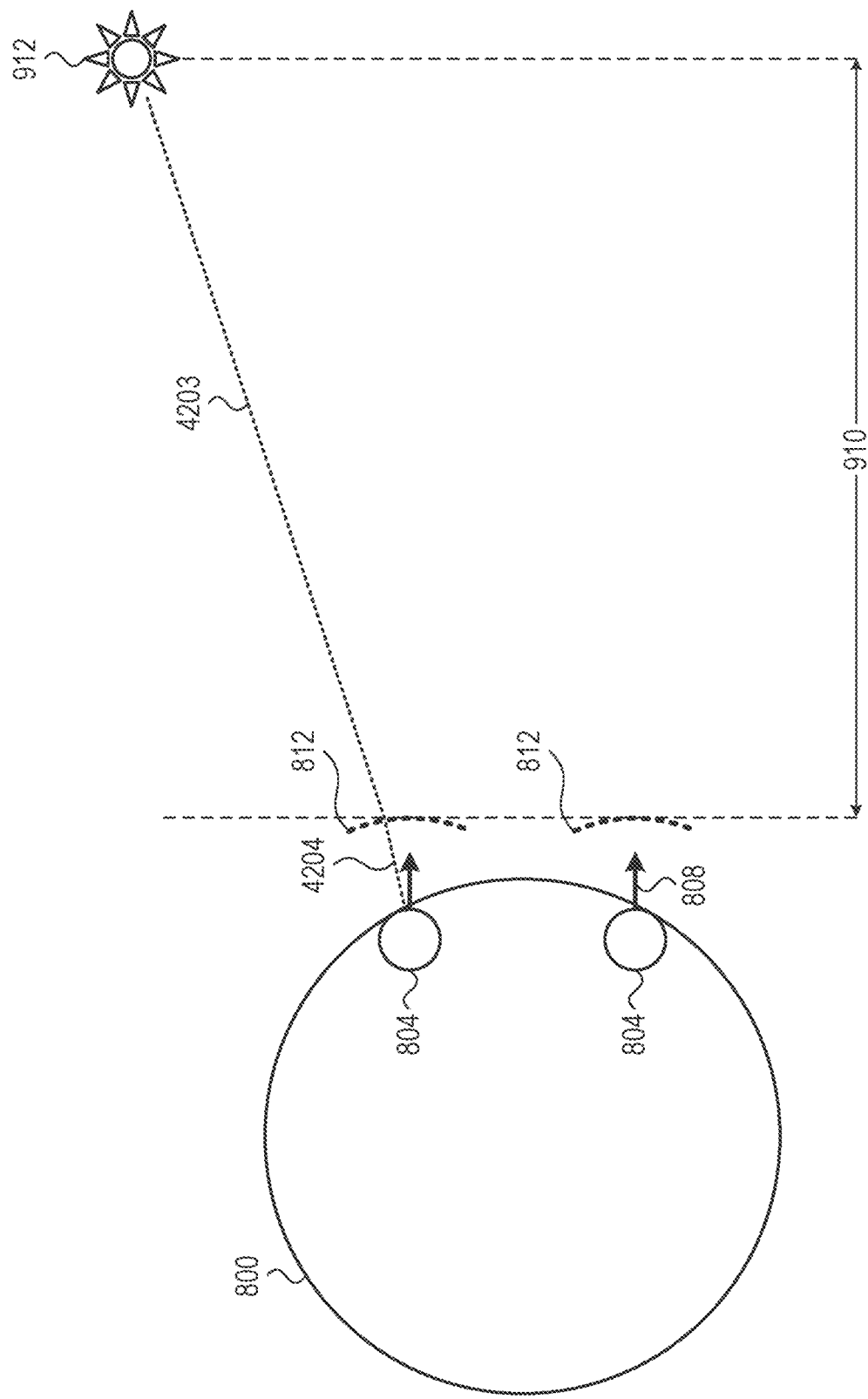
FIGS. 8A and 8B illustrate how translation movement produces modulation of light due to the wavelength selectivity of the pattern.
Figure 8B:
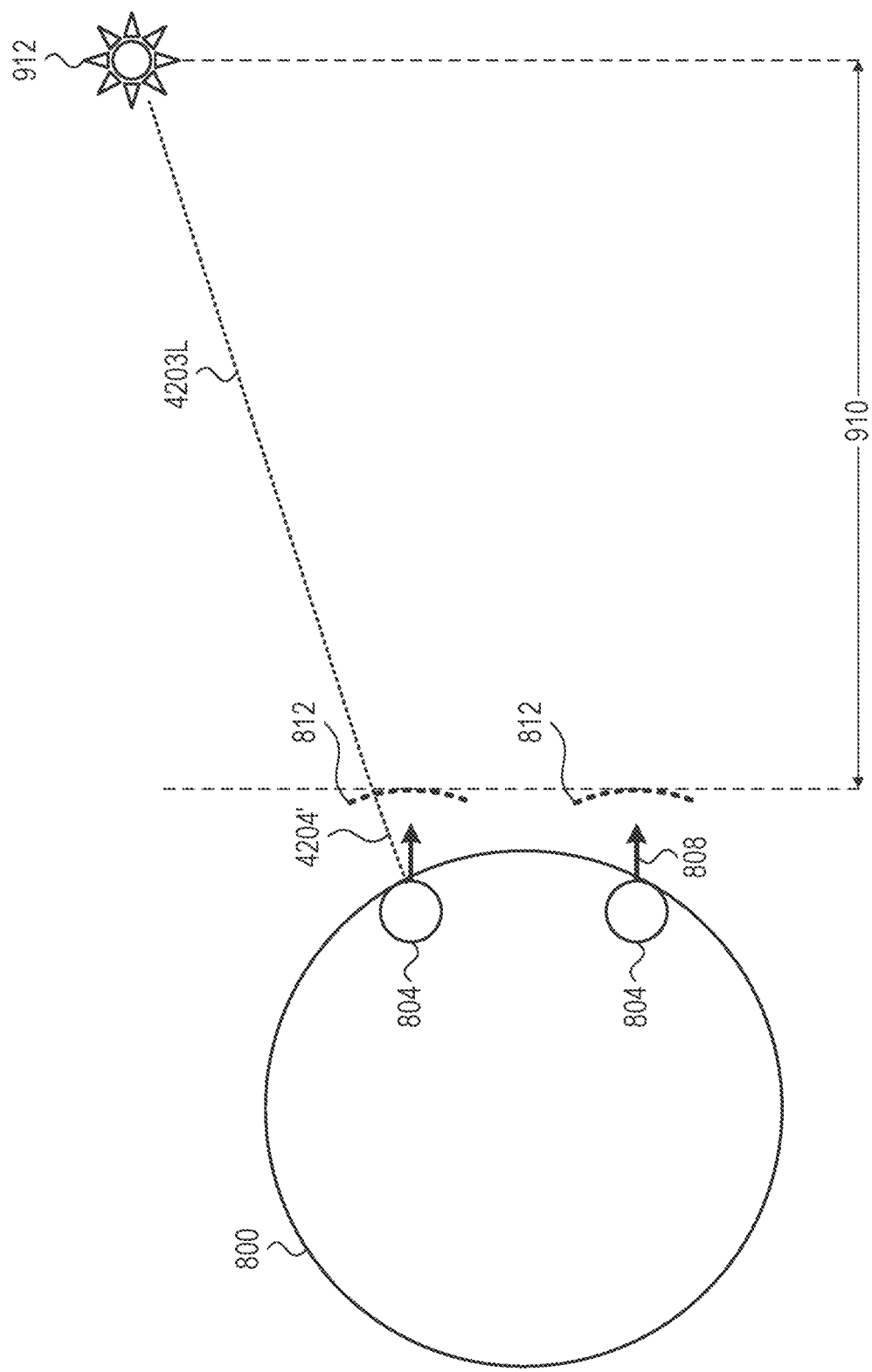

Reference is now made to FIGS. 8A and 8B exemplifying a similar effect resulting from a relative translation between the user with the eyewear and lens units, and a point-like light source. More specifically, FIGS. 8A and 8B illustrate the position through which a ray is transmitted during translational motion, for example, walking. While walking, depending on the position of the light source, the light pathway is transmitted through a different location on the lens unit, as can be seen from the position to the left of the translation motion arrow, and to the right of the arrow after the movement. For example, the signal in this case may vary depending on the position of the light source with respect to the lens unit, the velocity of the motion, and the pattern of the reflective coating on the lens. While the effect is directional and luminance dependent, average movements in the range of 10 per minute may be taken into account which is in the desired range of 0.2 Hz. In this non-limiting example, the temporal spectral coding is applied to the input light being transmitted through the lens unit towards the eye. It should be understood that the spectral pattern may be provided on the front or back surface of the lens unit and/or within the lens volume. These figures schematically illustrate, not to scale, translation of the user from a first position (FIG. 8A) to a second position (FIG. 8B) with respect to a point-like light source located generally in front of the user. In this example, different positions resulting from the translational movement are demonstrated in the figures by different distances 910 and 920 respectively from the light source. Light propagation path 4203 in FIG. 8A and light propagation path 4203' in FIG. 8B illustrate, respectively, the input light propagation from the light source 912 to the lens unit 812. As shown, depending on the different position of the lens unit (spectral pattern), as a result of the movement, the input light propagation path intersect the lens unit at regions of different wavelength selective properties, having different spectral transmissions. Accordingly, similar to the previous example, the movement of the eye, together with the lens unit in front of it, results in a temporal modulation of the amount of wavelength specific light reaching the eye. As also described above, the distribution of light impinging on the lens unit may be non-uniform. Additionally or alternatively, the spectral selective pattern may be not symmetric. Accordingly, translational movement of the head changes the relative amount of light falling on the first and second regions of the spectral selective pattern, and affect a further change in the amount of light reaching the eye.

The following is the description of a frequency components analysis in the spectral selective signal.

Temporal modulation of the light introduced to the eye may be analyzed in terms of its frequency components and would depend on the relative positions of the head, eyes, eyewear and lens unit with respect to the input light propagation, and with respect to the type and distribution of the input light. Temporal modulation rate would also depend on the spectral selective pattern geometry.

The actual amount of light reflected from the back surface of the lens unit into the eye can be considered by regarding, in 'stage 1', how much light can be reflected from each point on the back surface of the lens unit into the eye under complete reflectance, generating a 'light potential reflection distribution' (LPR distribution) which is dependent on (i) the environment (light sources and scene geometry and spectral composition of the input light), (ii) the head and eye and lens unit relative positions and orientations, but is not dependent on the (local) pointwise reflection coefficient (assuming "perfect" reflection). Then, in 'stage 2', the actual amount of light reflected from the back surface of the lens unit into the eye can be estimated by multiplying this light distribution by the pattern dependent, spectral dependent, reflection coefficient, and then integrated over the entire lens unit area.

Coupled head and eye movement, and in particular rotation, induces a change in the LPR distribution and induces a movement of the spectral selective pattern relative to this distribution. The rate of modulation of the spectral response is proportional, inter alia, to the rate of relative motion, and, in particular, to the rate this LPR distribution crosses the pattern spatial transitions. Thus, if, for example, the pattern features are arranged periodically with the 5 mm wide intervals (10 mm periodicity) and the LPR distribution moves over the lens unit at a constant rate in proportion to the head movement, say, at about 10 mm per second, then the dominant frequency of modulation of the light reflected into the eye at the specific spectral band is about 1 Hz.

The rate of movement of this LPR distribution over the lens unit as a result of the head rotation is approximately proportional to linearized lens angular speed. Thus, if the head rotates at 20 deg/sec and the radius of rotation of the lens is about 100 mm, then the linearized rate of movement of the LPR distribution across the lens unit is about 35 mm/sec. For a periodic pattern with the period of 25 mm, this would imply an induced modulation of the wavelength specific signal having a dominant frequency at about 1.4 Hz.

The following Table 1A outlines the approximate assumed conversion from degrees to mm on the lens based on the Back vertex distance (BVD), the distance between the lens and the eye rotation center, and the Head vertex distance (HVD), the distance between the lens and the head rotation center.

TABLE 1A

| | |
|---|---|
| Back vertex distance (BVD) [mm] | 27 |
| Head Vertex Distance (HVD) [mm] | 100 |
| Degrees to MM on Lens (from Eye Rotation Center (ERC)) | 0.47 |
| Degrees to MM on Lens (from Head Rotation Center HRC) | 1.75 |

The following Table 1B outlines different parameters that may be experienced by a user with some assumptions of values for different translational motions when the minimal translational motion is referred to as slow, and the minimal translational motion is referred to as fast:

TABLE 1B

| | Unit | Slow (min) | Fast (max) |
|---|---|---|---|
| Eye Velocity | deg/s | 150 | 300 |
| Head Velocity | deg/s | 20 | 100 |
| On-Off distance | mm | 500 | 1000 |
| Walking velocity | mm/s | 500 | 1000 |

The following Table 1C outlines possible head rotation and eye frequencies for different periodicity (on-off distance):

TABLE 1C

| | Frequency (Hz) | Frequency (Hz) | Time (s) |
|---|---|---|---|
| On-Off distance mm 5 | | | |
| Head Rotation | 7.0 | 9.4 | 0.1 |
| Eye Rotation | 14.1 | 28.3 | 0.1 |
| On-Off distance mm 10 | | | |
| Head Rotation | 3.5 | 4.7 | 0.3 |
| Eye Rotation | 7.1 | 14.1 | 0.1 |
| On-Off distance mm 20 | | | |
| Head Rotation | 1.7 | 2.4 | 0.6 |
| Eye Rotation | 3.5 | 7.1 | 0.3 |

Table 1D below provides approximate ranges for such dominant frequencies depending on different head rotation rates and different patterns that are approximated as periodic patterns of certain widths/periods.

TABLE 1D

| | Approximate Values | |
|---|---|---|
| Head vertex distance, d, (head radius of rotation; lens surface to rotation axis) | 100 mm | |
| | Low | High |
| Head rotation radial velocity, v, (degrees/second) | 20 | 100 |
| Linearized rate of movement of light distribution along the lens unit surface. [mm/sec] $(2 \times \pi \times d) \times v/360$ | 35 | 175 |
| Pattern periodicity repetition component (2 × pattern width) [mm] (Patterns widths: 5/15/20 mm) | 10/30/40 | 10/30/40 |
| Dominant frequency component | 3/1/0.7 Hz | 17.4/5.8/4.3 Hz |

Table 1E below provides approximate ranges for such dominant frequencies depending on different eye rotation rates and different patterns components considered as periodic patterns of certain widths.

TABLE 1E

| | Approximate Values | |
|---|---|---|
| Eye vertex distance (eye radius of rotation; lens surface to rotation axis) | 27 mm | |
| | Low | High |
| Eye rotation radial velocity (degrees/second) | 150 | 300 |
| Linearized rate of movement of center of LPR distribution along the lens unit surface. [mm/sec] | 70 | 140 |
| Pattern periodicity repetition component (2 × pattern width) [mm] (Patterns widths: 5/15/20 mm ) | 10/30/40 | 10/30/40 |
| Dominant frequency component | 4.2/1.4/1 Hz | 8.4/2.8/2.1 Hz |

The amount of light reflected into the eye due to the spectrally selective reflection and as a function of eye movement depends on (i) the compound pattern of light that is generated by the uniformity/non-uniformity of the spectral selective pattern geometry and by the uniformity/non-uniformity of the light distribution falling on the lens unit and (ii) the relative position of the eye (as function of the eye movement) which results in that different parts of this compound pattern of light are reaching the eye. Consequently, rotation of the eye will generate a rotation dependent signal and different rates of rotation would result in different temporal signals (different frequencies). However, it is necessary that the compound pattern will have spatial components that will correspond to the eye response to generate these eye position dependent differences and respective signals.

The eye integrates light coming from the lens unit non-uniformly, giving higher weight to light reaching the eye from the center of the field of view (FOV) being the region stimulating foveal vision. Eye rotation changes the orientation of the central field of view (orientation of the line of sight), and, in particular, changing the orientation of the center of the field of view, thereby moving the line of sight of the eye along the lens unit and changing the integrated signal. For a simplified explanation, the integration performed by the eye during eye rotation can be considered as an integrating window, i.e. a low pass filter passing over the pattern.

If, for example, the eye rotates at about 150 deg/sec, at a radius of rotation with respect to the lens unit of about 27 mm, the linearized rate of movement of the center of the field of view along the lens unit is about 70 mm/sec. If, for example, the spectral selective pattern has a low frequency component that, in the spatial domain, corresponds to a pattern period of 40 mm, then the signal would comprise a dominant component at about 1.7 Hz.

The spectral selective modulation of light entering the eye as a result of translation of the user with respect to the environment, can be analyzed along similar lines as head rotation, with appropriate modifications. Results, indicating predominant frequency components that are evident in the spectral selective light modulation, are summarized in Table 1E above.

The invention claimed is:

1. A lens unit for use in an eyewear element through which a user's eye is exposed to a scene, comprising a lens substrate having a certain volume defining front and back surfaces, and carrying a spectral coder; wherein:

said spectral coder comprises a spectral selective pattern formed by an array of regions of the lens substrate having different spectral properties, defining together a predetermined spatial transition profile and spectral and geometrical parameters; wherein each region in the array of regions of said spectral selective pattern has a certain wavelength selectivity different to that of adjacent regions, the spectral and geometrical parameters include a number of regions of the different wavelength selectivity, lateral shape and size of the regions, said spectral selective pattern of the spectral coder is in the form of discrete regions of the different wavelength selectivity, or regions with smooth/continuous transition between them;

the spectral and geometrical parameters of the spectral selective pattern, including the number of regions of different wavelength selectivity, lateral shape and size of the regions, are selected such that the spectral selective pattern is substantially non-diffractive with respect to a given operational spectrum of the lens, providing that said predetermined spatial transition profile corresponds to a spatially variable interference filter inducing interference created in a transverse direction to lateral dimensions of the different regions of the pattern, providing that, when the lens unit is in use, the spectral coder operates as a temporal spectral coder with respect to a portion of input light interacting with the lens unit and reaching the user's eye, causing generation of a low frequency wavelength dependent flickering signal providing low frequency temporal change of spectral selective modulation, resulting from natural movement of the user's eyes or head, thereby increasing the amount of blue light reaching the eye, to thereby prevent or control progression of myopia.

2. The lens unit of claim 1, wherein said certain wavelength selectivity is defined by a certain relation between a light response of said region to incident light of different wavelengths.

3. The lens unit of claim 1, wherein the spectral selective defines a plurality of spatial transitions arranged along at least one lateral axis across the lens unit.

4. The lens unit of claim 3, wherein said spectral selective pattern is configured to define at least three spatial transitions.

5. The lens unit of claim 1, wherein said spatial transition profile has a certain variable periodicity along at least one lateral axis of the lens unit.

6. The lens unit of claim 5, wherein the variable periodicity is lower towards side regions of the lens substrate.

7. The lens unit of claim 1, wherein said regions of the spectral selective pattern comprise two or more regions having certain geometrical shapes including at least one of an elongated substantially rectangular shape, and a substantially ring-like shape.

8. The lens of claim 7, wherein the substantially ring-like shaped regions include at least one of oval, circle and ellipse.

9. The lens unit of claim 1, wherein the spectral selective pattern includes a pattern having a width of at least 5 mm.

10. The lens unit of claim 1, wherein a ratio between different wavelength selectivities measured at different positions of the lens unit, either in transmittance through the lens unit or in reflection from the back surface of the lens, is at least 2.

11. The lens unit of claim 1, wherein the regions of the array have the same size.

12. The lens unit according to claim 1, wherein said low frequency wavelength dependent flicking signal being in a frequency range of about 0.2 Hz to 20 Hz.

13. The lens unit of claim 1, wherein at least one of the front and back surfaces of the lens unit is coated with a coating structure forming the spectral selective pattern.

14. The lens unit of claim 13, wherein said coating structure comprises a multi-layered coating structure being configured for coating the back surface of the lens; said multi-layered coating structure comprising at least one patterned layer comprising the spectral selective pattern.

15. The lens unit of claim 14, wherein said multi-layered coating structure comprises at least one reflective layer having reflective properties being configured to reflect light at wavelengths in the range of about 440 nm to 500 nm.

16. The lens unit of claim 15, wherein the at least one reflective layer is patterned or has a reflection coefficient in the range of about 440 nm to 500 nm being higher than 10%.

17. The lens unit of claim 14, wherein said multi-layered coating structure further comprises an anti-reflective layer interfacing the back surface of the lens.

18. The lens unit of claim 1, wherein at least one of the front and back surfaces of the lens unit is tinted with a tinting forming the spectral selective pattern.

19. The lens unit of claim 1, wherein said spectral coder has one of the following configurations: is a coating on either the front or back surface of the lens unit; is embedded within either the front or back surface of the lens unit; or embedded in the volume of the lens unit.

20. A lens unit comprising a lens substrate having a certain volume defining front and back surfaces, wherein the lens unit carries a spectral coder which, when the lens unit is in use, operates as a temporal spectral coder with respect to a portion of input light interacting with the lens unit and reaching the eye; said spectral coder comprises a spectral selective pattern formed by an array of regions of the lens substrate having different spectral properties defining together a predetermined spatial transition profile and spectral and geometrical parameters; wherein each region in the array of regions of said spectral selective pattern has a certain wavelength selectivity different to that of adjacent regions, the spectral and geometrical parameters including a number of regions of the different wavelength selectivity, lateral shape and size of the regions, wherein the spectral and geometrical parameters of the spectral selective pattern are configured to enable treatment of at least one eye disorder, wherein the back surfaces of the lens unit is coated with a coating structure forming said spectral selective pattern, said coating structure comprising a multi-layered coating structure comprising at least one patterned layer comprising said spectral selective pattern.

* * * * *